C. D. GALVIN.
PNEUMATIC TUBE FOR VEHICLE AND OTHER WHEELS.
APPLICATION FILED JAN. 17, 1912.
1,023,728.
Patented Apr. 16, 1912.
2 SHEETS—SHEET 2.
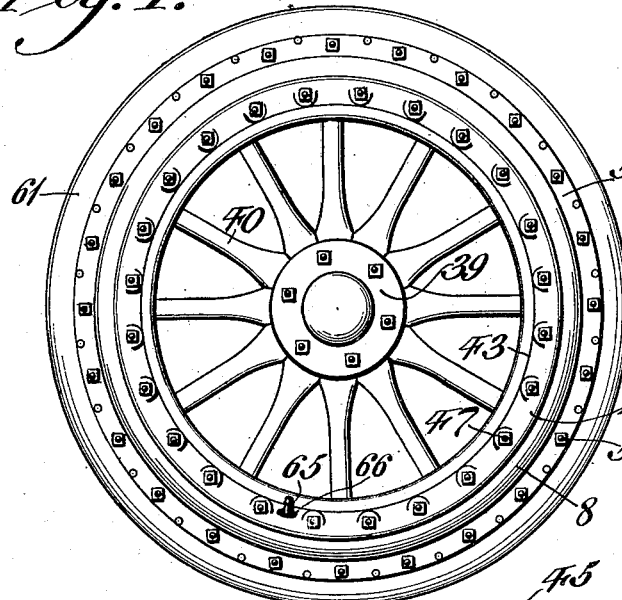
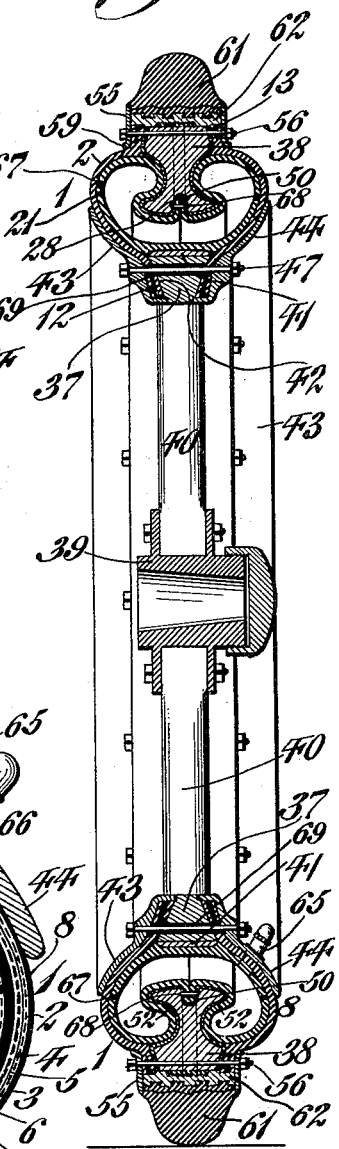
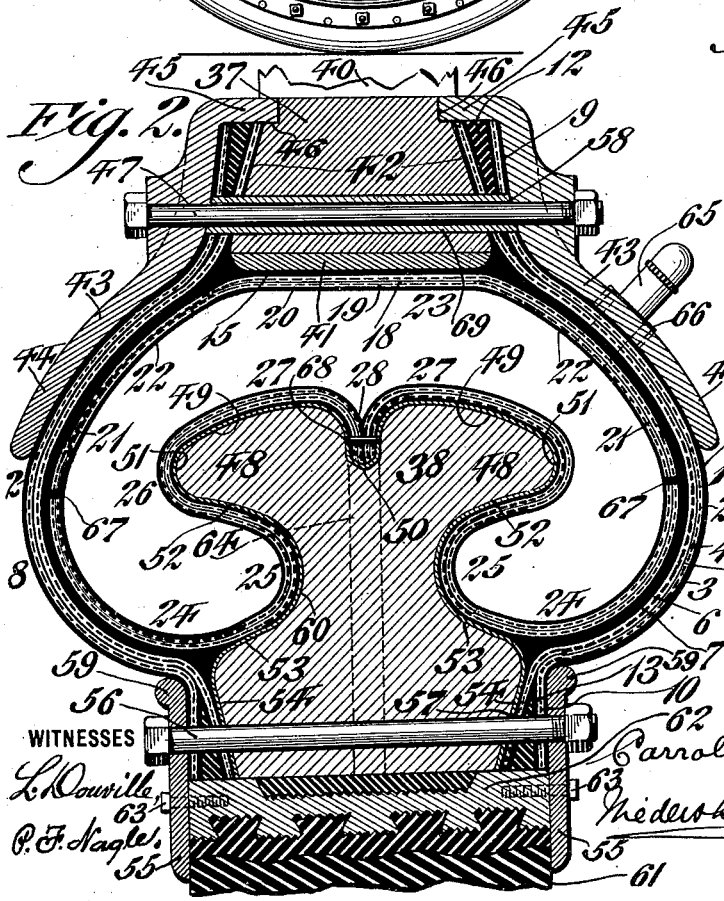
WITNESSES
L. Douville
P. F. Nagle
INVENTOR
Carroll D. Galvin,
by
[signature]
ATTORNEYS

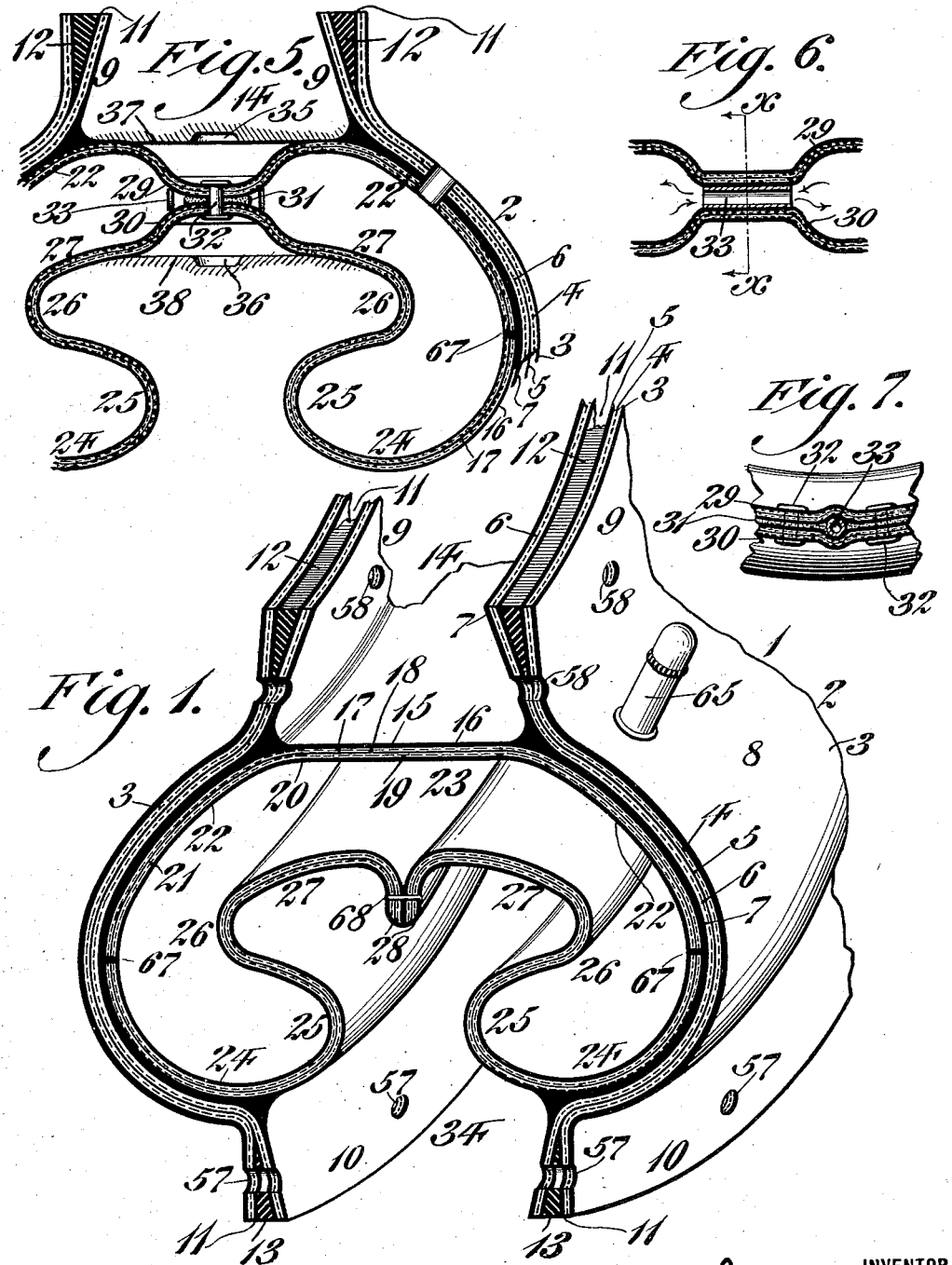

UNITED STATES PATENT OFFICE.

CARROLL D. GALVIN, OF MERCHANTVILLE, NEW JERSEY, ASSIGNOR OF ONE-SIXTH TO CHARLES JACOBSEN, ONE-SIXTH TO EUGENE S. COCHRAN, AND ONE-SIXTH TO AMANDUS F. JORSS, ALL OF WASHINGTON, DISTRICT OF COLUMBIA.

PNEUMATIC TUBE FOR VEHICLE AND OTHER WHEELS.

1,023,728. Specification of Letters Patent. Patented Apr. 16, 1912.

Original application filed December 6, 1911, Serial No. 664,139. Divided and this application filed January 17, 1912. Serial No. 671,734.

*To all whom it may concern:*

Be it known that I, CARROLL D. GALVIN, a citizen of the United States, residing at Merchantville, county of Camden, State of New Jersey, have invented a new and useful Pneumatic Tube for Vehicle and other Wheels, of which the following is a specification.

In a contemporaneously pending application filed by me December 6th, 1911, Serial No. 664,139, of which in its broad aspects, this application is a division, I have shown and described a novel construction of vehicle wheel having an inner pneumatic tube adapted to be placed between the inner and outer fellies of a novel vehicle wheel, and provided with a novel construction of outer driving disks having inner and outer novel flanges adapted to coact with novel fastening devices, to which construction, *per se*, I made no claim in said prior application, but to which my present invention is broadly directed.

My present invention therefore comprises a novel construction of inner pneumatic tube of novel and peculiar contour, and provided with inner and outer driving disks having inner and outer fastening devices of novel construction.

It also consists in a novel construction of inner pneumatic tube provided with an inner annular wedge shaped pocket or recess and an outer T-shaped recess also terminating in an annular outer wedge shaped pocket, said pockets being formed between a pair of inner and outer flanges forming the terminals of a novel construction of driving disks.

It further consists in a novel manner of making and assembling the outer driving disks and the inner pneumatic tube.

It further consists in a novel construction of outer driving disks having inner and outer annular flanges provided with wedge shaped terminals.

It further consists of other novel features of construction, all as will be hereinafter fully set forth.

Figure 1 represents a perspective view of a section of a pneumatic vehicle tube, embodying my invention. Fig. 2 represents a vertical sectional view showing my novel construction of tube in assembled position with respect to its coacting adjuncts. Fig. 3 represents, on a reduced scale, a vertical sectional view of a vehicle wheel, having my invention applied thereto. Fig. 4 represents a side elevation of Fig. 3. Fig. 5 represents a vertical sectional view partially broken away of a slightly modified construction of the tube seen in Figs. 1, 2 and 3. Fig. 6 represents a sectional view of a portion of Fig. 5 showing the means for forming a communication between the tube sections. Fig. 7 represents a section on line $x$—$x$ Fig. 6.

Similar numerals of reference indicate corresponding parts in the figures.

Referring to the drawings:—1 designates my novel construction of pneumatic vehicle tube, the same comprising a pair of outer driving disks 2, whose construction will be best understood from Fig. 1 and as the construction of each is substantially the same, a description of one will suffice for both.

In the preferred embodiment in my invention, the outer layer 3 of the driving disk is composed of rubber, against which is placed a layer of fabric 4, against which is placed a thin layer of rubber 5, against which is placed a fabric 6, against which is placed the inner rubber layer 7, said parts being vulcanized together by any suitable means, and it being apparent that the layers of fabric and rubber may be increased or diminished according to requirements.

I shape the driving disk, composed of the layers 3, 4, 5, 6 and 7, so that the same has a curved or convex contour 8, which terminates in the inner and outer annular peripheral flanges 9 and 10, the terminals of each of said flanges being provided with recesses or pockets 11, which have located therein, wedge shaped or V-shaped annular cores 12 and 13; 12 designating the inner core and 13 the outer core; said cores being composed of any hard, incompressible material, such as vulcanized rubber or the like, whereby a distended or wedge shaped inner and outer flange, as 9 and 10, is formed, as will be understood from Figs. 1, 2 and 3. I do not desire to be restricted in every instance to the wedge shaped terminal, as the contour of the same may be varied according to requirements. By the employment of the two outer convex driving disks 2 juxtaposed to each other or assembled, as seen in Figs. 1 and 2, it will be apparent that between the inner flanges 9 is formed an inner annular pocket 14, whose side walls converge inwardly, and whose outer wall 15, is formed by a portion of the periphery of my novel inner pneumatic tube, whose construction will now be described.

The outer portion of the inner tube is composed of a layer of rubber 16, against which is a layer of fabric 17, against which latter is a layer of rubber 18, against which is fabric 19, against which is the inner layer of rubber 20, the layers being vulcanized together and being increased or diminished according to requirements. The inner section 21 of the tube is provided with the two curved or arc-shaped portions 22, which converge into the flat or plane surface 23 and the outer surfaces of the curved portions 22 are vulcanized to the layers of rubber 7 already described, along their lines of contact therewith. The outer portions of the inner pneumatic tube, consist of the curved portions 24 which are curved inwardly and away from the vertical center of the tube at 25 and continued inward and toward the vertical center of the tube at 26, whereby the curved portions 27 are formed, which have terminals 28, which are juxtaposed, so that their inner surfaces will be brought into contact, as indicated in Figs. 1, 2 and 3, special attention being directed to the fact that the radii of curvature of the surfaces 22 and 27 are substantially the same so that said surfaces are substantially concentric and in case of deflation of the inner tube, the juxtaposed surfaces may ride upon each other without detriment to the tube or any portion thereof. I may secure the juxtaposed outer terminals 28, by any suitable stitching or riveting as 68, or by clips, so that said terminals can be readily disconnected and the interior of the tube will be readily accessible at all times, for the purposes of inspection or repairs by reopening. If desired I may deflect opposite portions of the pneumatic tube, so as to bring the same together, as indicated at 29 and 30, in Fig. 5, the juxtaposed portions having a layer of suitable material 31 between them and being connected by a rivet 32 or its equivalent, and I may interpose between the juxtaposed portions 29 and 30 at suitable intervals equalizing tubes or ports 33 as will be understood from Figs. 6 and 7, whereby air can pass from the right to the left hand portion of the tube and vice versa, recesses 35 and 36 being provided in the inner and outer fellies 37 and 38 for the reception of the unit ends in case of deflation. I preferably form the portions 21 and 24 of the inner tube in sections whose abutting edges are vulcanized on the line 67, but said sections may be continuous if desired. By the employment of the pair of outer driving disks 2 having the inner pneumatic tube vulcanized thereto in the manner explained, I form the upper pocket 14 which has already been referred to and also form an outer T-shaped pocket 34 having converging outer walls, the functions of which pockets 14 and 34 will now be described.

In Figs. 2 and 3, I show my novel construction of inner tube and its adjuncts, as applied to a wooden or other automobile wheel, of the conventional type, wherein 39 represents a wheel hub, having the spokes 40 radiating therefrom, said spokes engaging the inner felly 37 in the usual manner. The inner felly 37 is provided with the outer metallic tire 41, and its side walls 42 are beveled or faced, so as to diverge outwardly, as will be understood from Figs. 2 and 3, said felly being shaped so as to snugly fit the annular pocket 14 seen in Fig. 1, it being apparent that the inner walls of the outer peripheral flanges 9, snugly fit the walls 42 when the parts are assembled throughout the entire circumferential periphery of the inner felly 37, and are held in position by the side plates 43, assembled, as in Figs. 2 and 3, each being provided with the outwardly flaring curved portions 44, which partially encompass the inner portion of the driving disks 2, as will be understood from Figs. 2 and 3; each of said side plates 43 being provided with the annular inwardly turned flange 45, which is seated in a recess 46 of the inner felly 37, said flanges 45 also embracing and concealing the edges of the inner flange 9 of the driving disks. By the tightening of the bolts or other fastening devices 47, the annular wedge shaped flanges 9 are tightly interlocked in the annular wedge shaped pockets, formed between the side walls 42 and the coacting opposite portions of the annular side plates 43, so that disengagement of the outer peripheral flanges 9 from the felly or the side plates is rendered practically impossible, since any increase of the load causes the wedge shaped terminals 9 to be more tightly interlocked in their wedge pockets and against the felly 37.

The bolts 47 may pass through sleeves, bushings or tubes 69, as shown in Fig. 2, but omitted from Fig. 3, for the sake of clearness of illustration. The outer felly 38 is shaped to conform to the contour of the outer annular pocket 34, seen in Fig. 1, and comprises the T-shaped members 48, which have the curved top walls 49, between which is located the annular groove 50, in which the juxtaposed terminals 28 are seated when the parts are assembled, the said top walls 49 being curved away from the vertical center of the tube and outwardly as indicated at 51, thence toward the vertical center of the tube and outwardly as indicated at 52, and thence away from the vertical center of the tube as indicated at 53, each side of said felly terminating in the outwardly converging walls 54, against which the inner walls of the outer peripheral flanges 10 of the driving disks contact when the parts are assembled; said outer flanges 10 being held in position by means of the annular plates 55, secured by the transverse fastening devices 56, which pass through openings 57 in the flanges 10, it being apparent that the fastening devices 47 pass through similar openings 58 in the inner flanges 9.

I preferably provide the inner edges of the annular plates 55 with outwardly flaring rounded corners 59 to prevent rim cutting, and when the transverse fastening devices 56 are tightened, any increase in the load will tend to more tightly interlock the outer terminals 10, when in suspension in the wedge shaped pockets adapted for their reception.

In practice, I prefer to reinforce the outer felly 38, by a thin metallic lining 60, which may be spun or otherwise secured in position, and whose function is to strengthen and stiffen said outer felly 38, so that the life of the same will be prolonged, said outer felly 38 being made of wood, reinforced by the metallic stiffening 60, or of other material, such as tubing, fiber and the like.

In practice I employ an outer hard rubber tread 61, which is secured by any suitable means to the metallic tire 62, which serves as a tire to outer felly as well as a bed plate for the rubber tread 61, the annular outer plates 55 being secured to said metal tire 62, by the auxiliary screws or other fastening devices 63, which prevents creeping of the tread on the felly. In order to strengthen and reinforce the outer felly 38, I employ dowel pins, 64, of metal or wood, but preferably the latter. To inflate the inner tube, I provide the inflation tube 65, the preferred position of which, will be apparent from Figs. 2 and 3, although the same may be placed in other locations, if desired, said inflation tube passing through an opening 66 in the side plate 43, whereby a slight degree of play may be allowed, said inflation tube passing through the outer driving disk and being in communication with the inner tube.

When the parts are assembled, as seen in Figs. 2 and 3, it will be apparent that ordinary wear is taken up on the outer tread 61, and by reason of the interposition of the metallic tire 62 and outer felly there is no possibility of puncture of the inner pneumatic tube under any conditions, the desired resilience being obtained through the medium of the inner pneumatic tube clenching the outer felly 38, which tube cannot become heated under ordinary conditions, since road friction is removed entirely from said inner pneumatic tube by the intervening non-conducting bodies.

By the employment of the annular inner and outer wedge shaped pockets 14 and 34, in conjunction with the coacting diverging and converging walls 42 and 54, respectively, of the outer felly 38, it will be seen that, when the parts are in assembled position, as the load increases, the outer and inner terminals of the driving disks will be more firmly locked in their wedge shaped pockets and against disengagement under all conditions and in addition, the power is directly transmitted from the inner felly 37 to the outer tread 61, by reason of my novel construction.

By my novel invention, the compressed air is employed both to resist side thrust and down thrust when under load. I accomplish this result by restricting the transverse movements of the pneumatic tube, by means of the rigid flaring side plates 43, which partially encompass the inner periphery of said pneumatic tube. The driving disks 2, juxtaposed on opposite sides of said tube, and firmly attached at their inner and outer peripheral terminals, form the outer peripheral restrictive walls to resist the side thrust, while at the same time being flexible to allow of resilience under the compression of the load and yet restrictive as against the side thrust of the juxtaposed walls of the outer T-shaped felly, making thereby opposing side walls and by compression forming annular air cushions.

It will be further understood that in my novel construction by thus carrying the outer felly 38 within the recess of the pneumatic tube, said felly becomes a riding member for the wheel body, in case of deflation, the exterior periphery of the inner felly and the interior periphery of the outer felly being substantially concentric. It will also be seen that the pneumatic tube and its adjuncts being thus placed within the inner periphery of the outer felly, distribute the load in practice over an area, five times as great as in the present practice, where the pneumatic tube and tire are placed exterior to the outer felly, thus enabling the load carrying capacity of the pneumatic tube to be increased in similar ratio by such distribution of weight over the increased area. By this novel construction of the tube placed interiorly to the felly, it also forms by means of this position a circular shock absorber, whereby rebound shock is instantaneously cushioned at right angles to any point of occurrence, by the pneumatic tube in its opposite segment thereto being restricted by its rigid felly.

I desire to call especial attention to the demountable feature of my novel pneumatic tube, since it can be quickly detached from the wheel body by simply removing the draw bolts 47 and the side plates 43 whereby the semi-flexible flanges 9 can be depressed and the entire pneumatic tube and its felly 38 with its attached tread 61 removed and quickly replaced with a substitute without the employment of skilled labor or special tools.

Having thus described my invention, what I claim as new and desire to secure by Letters Patent, is:—

1. The combination with a pneumatic tube having a central annular pocket and inflatable portions at opposite sides of said pocket, of flanges projecting radially outward from said tube portion and integral with said tube, said flanges forming between them a pocket in communication with the first-named pocket.

2. As a new article of manufacture, a pneumatic tube having outer inflatable portions directed toward each other and the vertical center of the tube, whereby a pocket of substantially T-form in cross-section is formed by and within the outer portion of the tube, and also having the inner portions of the walls forming said pocket divided and the ends opposed to each other connected together.

3. As a new article of manufacture, a pneumatic tube having a central annular pocket and inflatable portions at opposite sides of said pocket, flanges projecting outwardly from said tube portion and secured to said tube, said flanges forming between them a pocket in communication with said first-named pocket, and flanges extending inwardly from said tube and secured thereto, and adapted to be secured to a felly.

4. The combination with a pneumatic tube having outer inflatable portions directed toward each other and the vertical center of the tube, whereby a pocket of T-form in cross-section is formed by and within the outer portion of the tube, of driving disks disposed at opposite sides of the tube and having outer annular flanges between which is formed a wedge-shaped pocket in communication with the first-named pocket, and also having inner annular flanges between which is formed a wedge-shaped pocket, said flanges being provided with enlarged terminals.

5. The combination of a pneumatic tube having outer inflatable portions directed toward each other and the vertical center of the tube, whereby a pocket of substantially T-form in cross section is formed by and within the outer portion of the tube, driving disks disposed at opposite sides of the tube, outer annular flanges secured to said driving disks between which is formed a pocket in communication with the first-named pocket, inner annular flanges between which is formed a pocket, the outer terminals of each of said flanges being enlarged, and said tube, driving disks and flanges being composed of fabric and rubber vulcanized together.

6. As an improved article of manufacture, a pneumatic inflatable tube formed of alternate layers of fabric and rubber vulcanized together, said tube having the central portion of its exterior perimeter deflected inwardly toward its inner perimeter, thereby forming within the exterior walls of the tube an outer annular pocket open at its outer side, the side walls of said pocket forming annular side air compartments when inflated and annular terminals projecting outwardly beyond the walls forming said pocket, said terminals being adapted to be held in position by transverse fastening devices, and said side air compartments being connected by a transverse air passage.

7. In a device of the character stated, a pneumatic tube composed of the inner opposite arc-shaped portions 22 curved inward and toward the vertical center of the tube and having the intermediate portion 23, and the outer opposite portions 24 curved outwardly and toward the vertical center of the tube and having the inwardly curved portions 25, the portions 26 curved inwardly and away from the vertical center of the tube, and the portions 27 curved inwardly and toward the vertical center of the tube, said portions 23 and 27 being substantially concentric.

8. In a device of the character stated, a pair of opposed driving disks, inner and outer flanges therefor, and a pneumatic tube located between said driving disks and having the inner opposite arc-shaped portions 22 curved inward and toward the vertical center of the tube and provided with the intermediate portion 23, and the outer opposite portions 24 curved outwardly and toward the vertical center of the tube and having the inwardly curved portions 25, the portions 26 curved inwardly and away from the vertical center of the tube, and the portions 27 curved inwardly and toward the vertical center of the tube, said portions 23 and 27 being substantially concentric.

9. In a device of the character stated, a pair of opposed driving disks, inner and outer flanges therefor having wedge-shaped terminals that form pockets between them, said driving disks being composed of alternate layers of fabric and rubber vulcanized together, and a pneumatic tube composed of alternate layers of rubber and fabric vulcanized together and vulcanized to said driving disks, said tube having the opposite arc-shaped portions 22 curved inward and toward the vertical center of the tube, the portion 23 intermediate the portions 22, the outer opposite portions 24 curved outwardly and having the portions 25 curved inwardly and toward the vertical center of the tube, the portions 26 curved away from the vertical center of the tube and inwardly, and the opposite portions 27 curved inwardly and toward the vertical center of the tube, said portions 23 and 27 being substantially concentric.

10. The combination of a pneumatic tube having outer inflatable portions directed toward each other and the vertical center of the tube, whereby a central pocket of substantially T-form in cross-section is formed by and within the outer portion of said tube, said tube being composed of layers of fabric and rubber vulcanized together, driving disks composed of fabric and rubber vulcanized together, said driving disks having rubber interposed between them and said tube, said disks being vulcanized to said tube and disposed at opposite sides thereof, outer annular flanges extending from said driving disks, between which is formed an outermost pocket in communication with said first-named central pocket, and inner annular flanges extending from said driving disks between which is formed an innermost pocket adapted for the reception of a felly.

11. As a new article of manufacture, a pneumatic tube having a central annular pocket and inflatable portions at opposite sides of said pocket, said tube having the juxtaposed terminals 28, means for securing said terminals together, flanges secured to said tube and projecting outwardly therefrom, said flanges forming between them a wedge-shaped pocket, and inner flanges secured to said tube and extending inwardly therefrom and adapted to be secured to a felly.

CARROLL D. GALVIN.

Witnesses:
 C. D. McVay,
 M. C. Fox.

Copies of this patent may be obtained for five cents each, by addressing the "Commissioner of Patents, Washington, D. C."